(12) United States Patent
Johnson

(10) Patent No.: US 6,242,129 B1
(45) Date of Patent: Jun. 5, 2001

(54) THIN LITHIUM FILM BATTERY

(75) Inventor: Lonnie G. Johnson, Atlanta, GA (US)

(73) Assignee: Excellatron Solid State, LLC, Smyrna, GA (US)

( * ) Notice: Subject to any disclaimer, the term of this patent is extended or adjusted under 35 U.S.C. 154(b) by 0 days.

(21) Appl. No.: 09/286,112

(22) Filed: Apr. 2, 1999

(51) Int. Cl.$^7$ ................................................. H01M 10/02
(52) U.S. Cl. ................................. 429/162; 429/231.95
(58) Field of Search .................................. 429/127, 162, 429/231.95; 29/623.1

(56) References Cited

U.S. PATENT DOCUMENTS

| | | | |
|---|---|---|---|
| 3,237,078 | 2/1966 | Mallory | 320/17 |
| 3,393,355 | 7/1968 | Whoriskey et al. | 320/18 |
| 4,092,464 * | 5/1978 | Dey et al. | |
| 4,303,877 | 12/1981 | Meinhold | 320/18 |
| 4,614,905 | 9/1986 | Petersson et al. | 320/18 |
| 4,654,281 | 3/1987 | Anderman et al. | 429/209 |
| 4,719,401 | 1/1988 | Altmejd | 320/13 |
| 5,270,635 | 12/1993 | Hoffman et al. | 320/21 |
| 5,291,116 | 3/1994 | Feldstein | 320/4 |
| 5,314,765 | 5/1994 | Bates | 429/194 |
| 5,336,573 | 8/1994 | Zuckerbrod et al. | 429/252 |
| 5,338,625 | 8/1994 | Bates et al. | 429/193 |
| 5,362,581 | 11/1994 | Chang et al. | 429/249 |
| 5,387,857 | 2/1995 | Honda et al. | 320/18 |
| 5,445,906 | 8/1995 | Hobson et al. | 429/162 |
| 5,455,126 | 10/1995 | Bates et al. | 429/127 |
| 5,512,147 | 4/1996 | Bates et al. | 204/192.15 |
| 5,561,004 | 10/1996 | Bates et al. | 429/162 |
| 5,567,210 | 10/1996 | Bates et al. | 29/623.5 |
| 5,569,520 | 10/1996 | Bates | 429/162 |
| 5,597,660 | 1/1997 | Bates et al. | 429/191 |
| 5,612,152 | 3/1997 | Bates | 429/152 |
| 5,654,084 | 8/1997 | Egert | 428/215 |
| 5,778,515 | 7/1998 | Menon | 28/623.4 |
| 5,783,928 | 7/1998 | Okamura | 320/122 |
| 5,811,205 | 9/1998 | Andrieu et al. | 429/137 |
| 5,821,733 | 10/1998 | Turnbull | 320/116 |
| 6,001,139 * | 12/1999 | Asanuma et al. | |

OTHER PUBLICATIONS

Fragnaud et al. (Journal of Power Sources 63 (1996) pp. 187–191), No Month Available.*
Wang et al. (Journal Electrochemical Society 143 (Oct. 1996) pp. 3203–3213.*
Journal of Power Sources, P. Fragnaud, R. Nagarajan, D.M. Schleich, D. Vujic, Thin–film cathodes for secondary lithium batteries, 1995, vol. 54, pp. 362–366, No Month.
Materials Research Society, The Preparation and Characterization of Lithium Cobalt Oxide Thin Films by LPCVD, 1996, vol. 415, pp. 213–217, No Month.
Journal of Power Sources, Thin film solid electrolytes and electrodes for rechargeable lithium–ion batteries, J. Schoonman, E.M. Kelder, 1997, vol. 68 pp. 65–68, No Month.
Solid State Ionics, Fabrication of LiCoO2 thin film cathodes for rechargeable lithium battery by electrostatic spray pyrolysis, C.H. Chen et al., 1995, vol. 80 pp. 1–4, No Month.
Journal of Materials Science, Unique porous LiCoO2 thin layers prepared by electrostatic spray deposition. C.H. Chen et al., 1996, vol. 31, pp. 5437–5442, No Month.

\* cited by examiner

*Primary Examiner*—Carol Chaney
*Assistant Examiner*—Susy Tsang
(74) *Attorney, Agent, or Firm*—Baker, Donelson, Beerman & Caldwell

(57) ABSTRACT

A rechargeable, thin film lithium battery cell (10) is provided having an aluminum cathode current collector (11) having a cobalt coating sandwiched between two crystallized cathodes (12). Each cathode has an electrolyte (13) deposited thereon which is overlaid with a lithium anode (14). An anode current collector (16) contacts the anode and substantially encases the cathode collector, cathode, electrolyte and anode. An insulator occupies the spaces between these components and the anode current collector.

14 Claims, 4 Drawing Sheets

|  | Energy Whr/kg | Power W/kg | VOL Whr/l | Cycle Life | COST $/Whr |
|---|---|---|---|---|---|
| NiCd | 60 | 200 | 100 | 100 | 0.70 |
| NiMH | 90 | 100 | 160 | 200 | 0.87 |
| LLI | 120 | 200 | 300 | 300 | 0.95 |
| Li Poly | 125 | 100 | 250 | 500 | 0.65 |
| MLB Li-Ion | 250 | 2500 | 1041 | >10000 | 0.75 |
| MLB Li Metal | 300 | 6000 | 959 | >10000 | 0.75 |

*FIG. 5*

THIN LITHIUM FILM BATTERY

TECHNICAL FIELD

This invention relates generally to thin film batteries, and more particularly to thin film, rechargeable lithium ion batteries.

BACKGROUND OF THE INVENTION

Conventional, canister type batteries today includes toxic materials such as cadmium, mercury, lead and acid electrolytes. These chemicals are presently facing governmental regulations or bans as manufacturing materials, thus limiting their use as battery components. Another limitation associated with them is that the amount of energy stored and delivered by these batteries is directly related to their size and weight. Large batteries, such as those found in automobiles, produce large amounts of current but have very low energy densities (Watts hours per liter) and specific energies (Watt hours per gram). As such, they require lengthy recharge times which render them impractical for many uses.

To address the need for higher energy densities and specific energies, the battery industry has been moving towards lithium based batteries. The major focus of the battery industry has been on liquid and polymer electrolyte systems. However, these systems have inherent safety problems because of the volatile nature of the electrolyte solvents. These types of batteries have a relatively high ratio of inert material components, such as the current collector, separator, and substrate, relative to the active energy storage materials used for the anode and cathode. In addition, their relatively high internal impedance results in low rate capability (watts/kilogram) which renders them impractical for many applications.

Thin film lithium batteries have been produced which have a stacked configuration of films commencing with an inert ceramic substrate upon which a cathode current collector and cathode is mounted. A solid state electrolyte is deposited upon the cathode, an anode in turn deposited upon the electrolyte, and an anode current collector mounted upon the anode. Typically, a protective coating is applied over the entire cell. Lithium batteries of this type are describe in detail in U.S. Pat. Nos. 5,569,520 and 5,597,660, the disclosures of which are specifically incorporated herein. These lithiated cathode material of these batteries have a (003) alignment of the lithium cells, as shown in FIG. 1, which creates a high internal cell resistance resulting in large capacity losses.

Recently, it has been discovered that the annealing of lithiated cathode materials on a substrate under proper conditions results in batteries having significantly enhanced performances, for the annealing causes the lithiated material to crystalize. This crystallized material has a hexagonal layered structure in which alternating planes containing Li and Co ions are separated by close packed oxygen layers. It has been discovered that $LiCoO_2$ films deposited onto an alumina substrate by magnetron sputtering and crystallized by annealing at 700° C. exhibit a high degree of preferred orientation or texturing with the layers of the oxygen, cobalt and lithium are oriented generally normal to the substrate, i.e. the (101) plane as shown in FIG. 2. This orientation is preferred as it provides for high lithium ion diffusion through the cathode since the lithium planes are aligned parallel to the direction of current flow. It is believed that the preferred orientation is formed because the extreme heating during annealing creates a large volume strain energy oriented generally parallel to the underlying rigid substrate surface. As the crystals form they naturally grow in the direction of the least energy strain, as such the annealing process and its resulting volume strain energy promotes crystal growth in a direction generally normal to the underlying substrate surface, which also is the preferred orientation for ion diffusion through the crystal.

However, the limitations of these batteries have been the thickness and weight of their substrates upon which the layers of active material are laid upon. Because of the size of the substrate, these batteries have not been competitive with other formulations in terms of energy density and specific energy. High energy density cells have not been successfully constructed. The supporting substrates have been made of relatively thick sheets of alumina, sapphire, silica glass and various other types of ceramic material. The current collector and substrate of these batteries typically constitute nearly 70% of the total weight and an even larger percentage of the volume, thus only a small amount of the of the battery weight and volume is attributed to the active materials. This ratio of active material to the overall weight and volume of the battery limits their use.

With an annealing temperature below 600° C. the lithium material has no significant change in the microstructure, and thus the lithium orientation remains amorphous, as taught in Characterization of Thin-Film Rechargeable Lithium Batteries With Lithium Cobalt Oxide Cathodes, in the Journal of The Electrochemical Society, Vol. 143, No. 10, by B. Wang, J. B. Bates, F. X. Hart, B. C. Sales, R. A. Zuhr and J. D. Robertson. This amorphous state restricts lithium ion diffusion through the layers of oxygen and cobalt, and therefore creates a high internal cell resistance resulting in large capacity losses.

Hence, in order to anneal the lithiated cathode material to the most efficient orientation it was believed that the cathode had to be bonded to a rigid substrate and heated to nearly 700° C. for an extended period of time. Because of such extreme heating, it was believed that only certain metals with high melting points could be used as the cathode collector. A problem associated with these metals has been there inability to bond with the substrate material, as these metals "de-wet" thereby forming small pools upon the substrate surface. As such, cathode collectors have been made of cobalt overlaid with a layer of gold or platinum. During the annealing process the cobalt becomes a transition ion passing which is pulled through the gold or platinum and into the cathode material, thereby leaving the gold or platinum layer as the collector.

It was believed that a lightweight, low melting point metal, such as aluminum, could not survive the annealing process and therefore could not be used as a current collector in thin film lithium batteries having crystallized cathodes. This was a common belief even though such metals would be chemically compatible for use with lithium cathodes.

It thus is seen that a need remains for a high performance rechargeable, thin film lithium battery which is smaller and lighter than those of the prior art. Accordingly, it is to the provision of such that the present invention is primarily directed.

SUMMARY OF THE INVENTION

In a preferred form of the invention, a thin film lithium battery comprises an aluminum cathode collector, a crystallized lithium intercalation compound cathode deposited upon the aluminum cathode collector, an anode, an electrolyte disposed between the lithium intercalation compound cathode and the anode, and an anode collector coupled to the anode.

BRIEF DESCRIPTION OF THE DRAWINGS

FIG. 5 is a table showing a comparison of different batteries.

DETAILED DESCRIPTION

Figure 2:
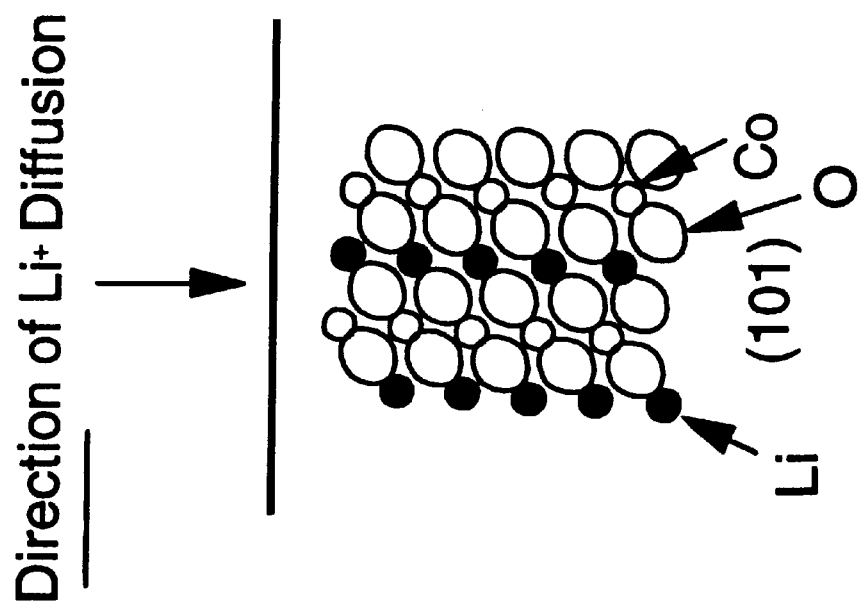
FIG. 2 is an illustration of a lithium intercalation compound oriented along the preferred (101) plane.
Figure 1:
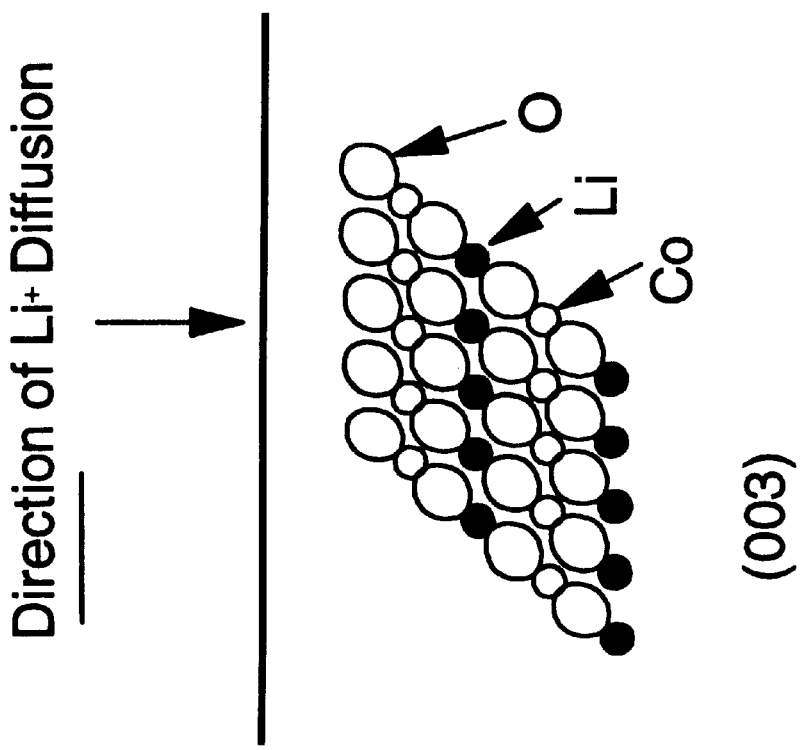
FIG. 1 is an illustration of a lithium intercalation compound oriented along the (003) plane.

With reference next to the drawings, there is shown in a rechargeable, thin film lithium battery cell 10 embodying principles of the invention in a preferred form. The battery cell 10 has an aluminum cathode current collector 11 sandwiched between two cathodes 12. The cathodes 12 are made of a lithium intercalation compound, preferably a metal oxide such as $LiNiO_2$, $V_2O_5$, $Li_xMn_2O_4$, $LiCoO_2$ or $TiS_2$. Each cathode 12 has a solid state electrolyte 13 formed thereon. The electrolyte 13 is preferable made of lithium phosphorus oxynitride, $Li_xPO_yN_z$. In turn, each electrolyte 13 has an anode 14 deposited thereon. The anode 14 is preferably made of silicon-tin oxynitride, SiTON, when used in lithium ion batteries, or other suitable materials such as lithium metal, zinc nitride or tin nitride. Finally, an anode current collector 16, preferably made of copper or nickel, contacts both anodes 14 to substantially encase the cathode collector 11, cathode 12, electrolyte 13 and anode 14. A solderable contact 16 may be mounted in electrical contact with the cathode current collector 11.

The battery cell 10 is preferably manufactured in the following manner. A web of approximately 4 micron thick aluminum foil is passed through a plasma treatment station to remove any oil residue from the foil. The aluminum foil is passed through a cathode Leybold chamber equipped with two large cryopumps and a series of rf or dc magnetron sputtering or diode sputtering cathodes positioned around a rotating drum in a substantially pure oxygen atmosphere. The sputtering cathodes deposit an approximately 3 micron thick cathode onto one side of the foil. The aluminum foil is then flips so that the magnetrons deposit a 3 micron thick cathode on the opposite side of the foil.

The coated foil is next removed from the coating chamber and segmented into pieces that are clamped onto aluminum frames. These frames act as both means for handling the material during processing and means for providing accurate mask registration during deposition of the materials. The coated foil is then sintered for approximately eight hours at a temperature of approximately 600° C. to crystalize the cathode material.

The electrolyte 13 is then deposited upon the cathodes 12 by the sputtering of lithium orthophosphate, $Li_5PO_4$, in a nitrogen atmosphere to produce a lithium phosphorus oxynitride layer. Similarly, each anode 14 is applied to the corresponding electrolyte 13 by sputtering. The anode current collector 16 is then deposited onto the anode by the sputtering of copper or nickel.

Figure 6:
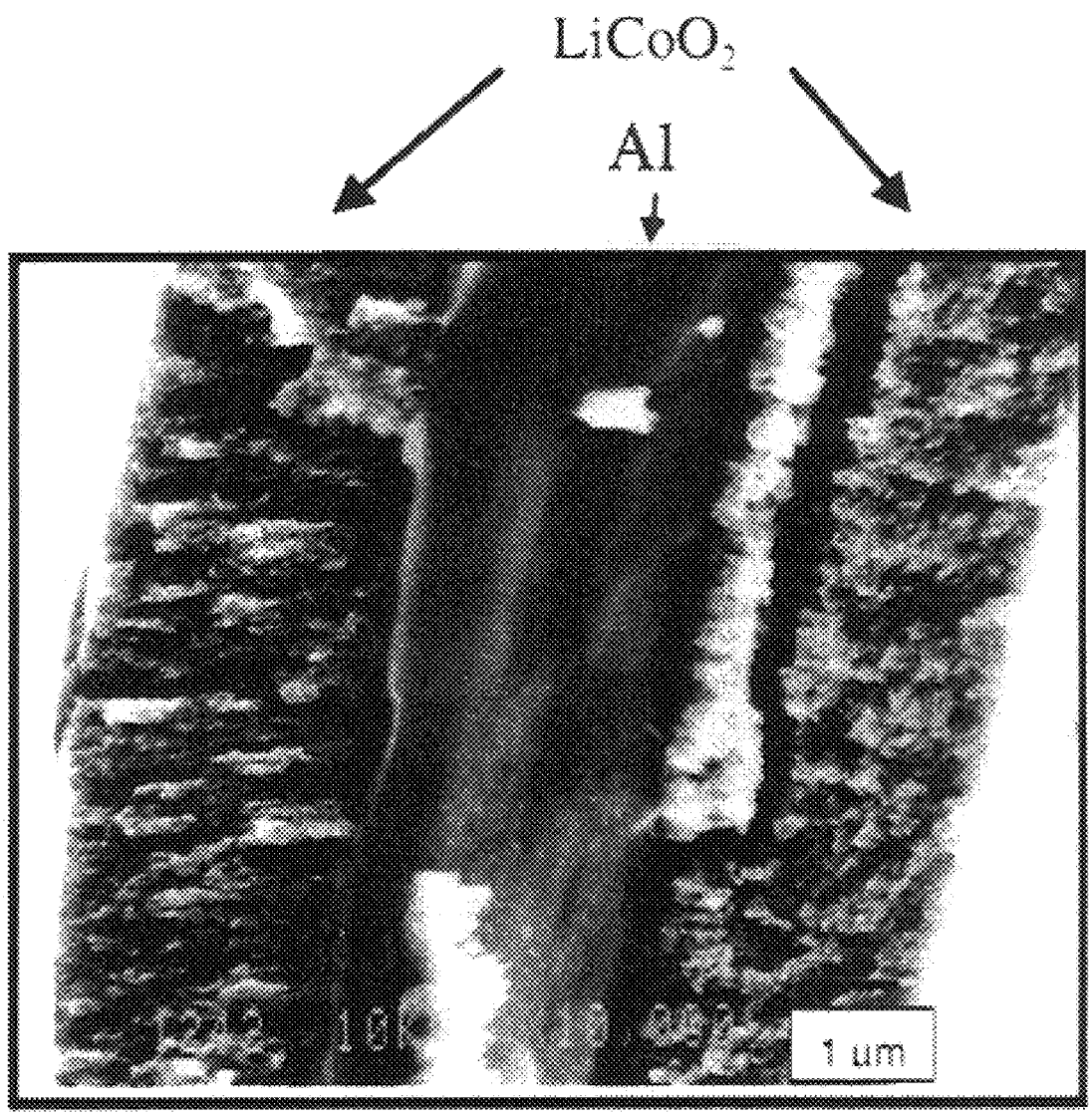
FIG. 6 is a photocopy of a photograph showing the aluminum cathode collector and lithiated cathode of the thin film lithium battery of FIG. 3.

It has been found that crystallized lithium material deposited upon the aluminum collector and annealed at 600° C. has the preferred (101) crystal growth plane orientation shown in FIG. 2. This orientation is believed to be achieved by minimizing the volume strain energy and maximizing the surface energy during crystal growth through the difference in the thermal expansion coefficient between the aluminum cathode collector and the lithium intercalation compound cathode. The thermal expansion coefficient of the aluminum cathode collector is $13.3 \times 10^{-6}$/°F. while the thermal expansion coefficient of the cathode material ($LiCoO_2$) is $4.5 \times 10^{-6}$/°F. The difference in the coefficients results in intension or compression strain in the lattice of the lithium intercalation material. It is this volumetric stress energy between the aluminum and the cathode which causes the re-orientation of the lithiated material from an amorphous condition to the crystalline (101) plane. The alignment of the lithiated material is illustrated in FIG. 6 which shows the lithiated cathode 12 aligned generally normal to the underlying aluminum collector 11, illustrated by the streaking of the cathode. This effective annealing at a temperature of 600° C. on an aluminum film greatly improves the efficiencies in the manufacturing of the battery. Successful annealing on an aluminum substrate is remarkable because the annealing temperature of 600° C. is very close to the aluminum melting temperature of 648° C. The aluminum has almost no structural strength at this temperature and therefore is very limited in its ability to apply the required strain energy to the cathode material deposited thereon.

Figure 4:
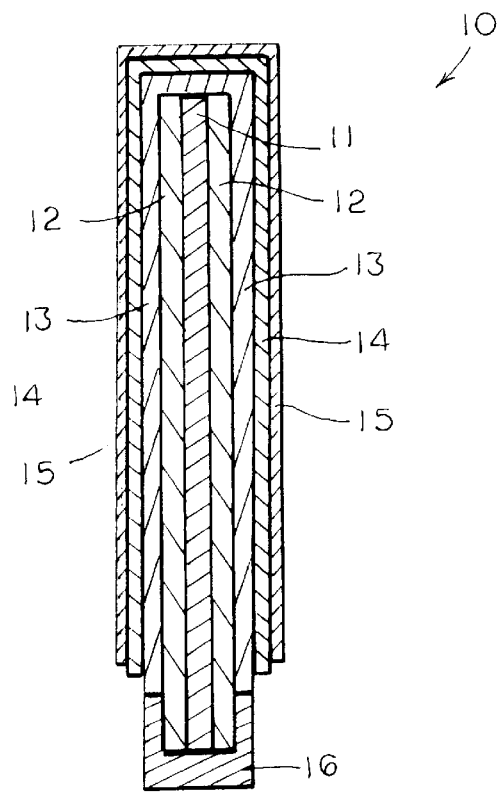
FIG. 4 is a cross-sectional view of the thin film lithium battery of FIG. 3 taken along plane 4–4.
Figure 3:
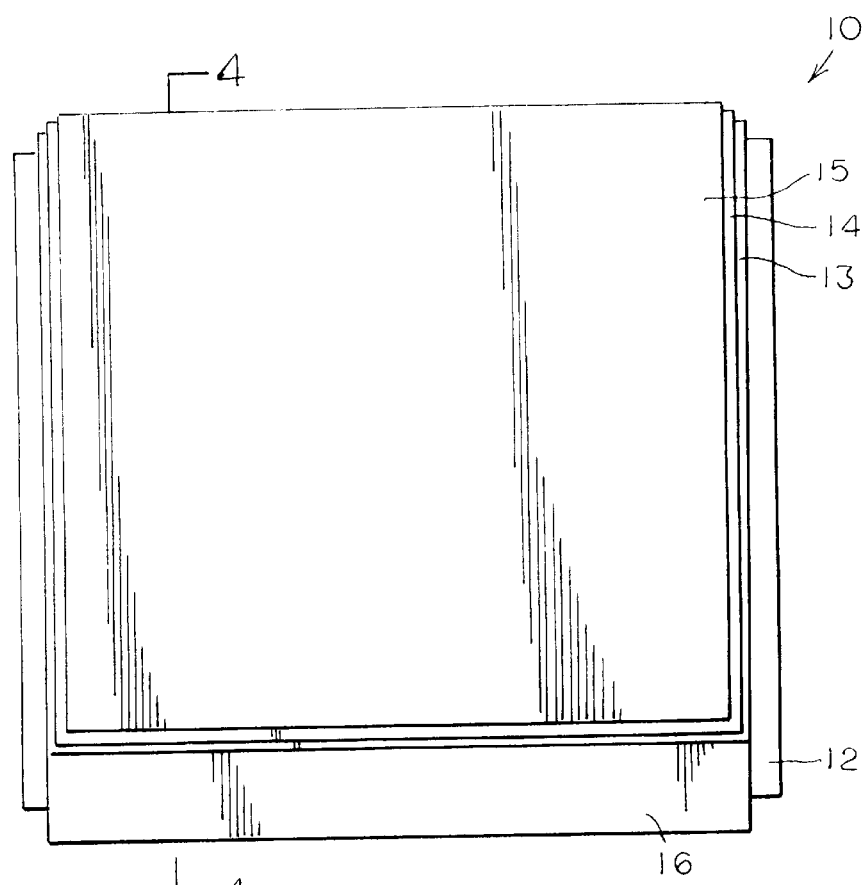
FIG. 3 is a plan view of a thin film lithium battery illustrating principles of the invention in a preferred embodiment.

As best shown in FIGS. 3 and 4, the end of the cathode collector is exposed so that the battery cell may be conventionally connected to other similar cells in either an electrical series or in parallel circuit.

The just describe battery cell is fabricated with a surface area of approximately ten (10) square centimeters, a weight of approximately $5.4 \times 10^{-2}$ grams, and a thickness of approximately 14 microns. This configuration shows a capacity of 82.4 milliamp hours. Using 82.4 millamps as the 1C charge or discharge rate, these cells show a degradation of less than 20% at discharge rates of over 10C, i.e. 824.0 milliamps. The energy density of the cell is approximately 293 Watt hours per kilogram based on the combined masses of the cathode, electrolyte, current collectors and anode. It should be noted that the cell does not have an initial substrate which was previously required in the production of thin film lithium batteries. This advantageously reduces the weight and thickness as compared to those thin film lithium batteries of the prior art which utilized other heavier and thicker substrates.

FIG. 5, shows a comparison of the inventive lithium ion battery (MLI Li-Ion) and inventive lithium metal battery MLI (Li Metal) with a lithium polymer battery (Li Poly), liquid lithium ion battery (LLI), nickel metal hydride battery (NiMH) and nickel cadmium battery (NiCd). The table of FIG. 5 illustrates that the inventive batteries deliver a substantial increase in energy (Whr/kg), a dramatic increase in power (W/kg), a dramatic increase in the energy for a given volume size (Whr/l) and a dramatic increase in the number of times the battery may be cycled through charges and discharges. The decrease in the size and weight of the cells allows batteries to be manufactured smaller and lighter without decreasing their capacity and power output, as compared to batteries of the prior art. Alternatively, because of the reduced thickness of the cells, the number of cells in a battery may be increased to achieve a greater capacity without increasing the battery same size and weight as compared with previous manufactured thin film lithium battery cells that utilize an underlying substrate.

It is believed that the aluminum foil may be pre-annealed prior to the deposition of the cathode material so limit deformation of the aluminum foil.

It should be understood that an insulator, such as parylene, may be used to fill any spaces between these components and the anode current collector 16.

It should be understood that the aluminum foil need not be pure aluminum. Certain aluminum alloys may also be utilized, hence the term aluminum used herein also refers to aluminum alloys. Also, the aluminum foil may include a thin coating of cobalt or titanium deposited by conventional sputtering methods.

It thus is seen that a high rate capability battery is now provide which is lighter and smaller than those of the prior art. It should of course be understood that many modifications may be made to the specific preferred embodiment described herein without departure from the spirit and scope of the invention as set forth in the following claims.

What is claimed is:

1. A thin film lithium battery comprising:
   an aluminum cathode collector having a cobalt coating;
   a crystallized lithium intercalation compound cathode deposited upon said aluminum cathode collector;
   an anode;
   an electrolyte disposed between said lithium intercalation compound cathode and said anode; and
   an anode collector coupled to said anode.

2. The thin film lithium battery of claim 1 wherein said cathode comprises two layers disposed upon opposite sides of said cathode collector.

3. The thin film lithium battery of claim 2 wherein said electrolyte comprises two layers sandwiching said cathode layers.

4. The thin film lithium battery of claim 3 wherein said anode comprises two layers sandwiching said electrolyte layers.

5. The thin film lithium battery of claim 4 wherein said anode collector comprises two layers sandwiching said anode layers.

6. A thin film lithium battery comprising:
   an aluminum cathode collector having a cobalt coating;
   a lithium intercalation compound cathode sandwiching said collector;
   an electrolyte overlaying said cathode;
   an anode overlaying said electrolyte; and
   an anode collector coupled to said anode.

7. The thin film lithium battery of claim 6 wherein said cathode comprises two layers disposed upon opposite sides of said cathode collector.

8. The thin film lithium battery of claim 7 wherein said electrolyte comprises two layers sandwiching said cathode layers.

9. The thin film lithium battery of claim 8 wherein said anode comprises two layers sandwiching said electrolyte layers.

10. The thin film lithium battery of claim 9 wherein said anode collector comprises two layers sandwiching said anode layers.

11. The thin film lithium battery of claim 6 wherein said cathode is a crystallized lithium intercalation compound.

12. A method of producing a thin film lithium battery comprising the steps of:
    providing an aluminum cathode collector having a cobalt coating;
    depositing a lithium intercalation compound cathode upon the aluminum cathode collector;
    mounting an electrolyte upon the cathode;
    mounting an anode upon the electrolyte; and
    mounting an anode collector upon the anode.

13. The method of producing a thin film battery of claim 12 wherein the lithium intercalation compound cathode is deposited upon opposite sides of the aluminum cathode collector.

14. The method of producing a thin film battery of claim 13 wherein the electrolyte, the anode and the anode collector sandwich the aluminum collector and cathode.

* * * * *